US007327834B1

(12) United States Patent
Hiers et al.

(10) Patent No.: US 7,327,834 B1
(45) Date of Patent: Feb. 5, 2008

(54) METHOD AND SYSTEM FOR PROVIDING INTERACTIVE EVENT REMINDERS

(75) Inventors: Sue Ellen Hiers, Durham, NC (US); Akin Sasore, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 105 days.

(21) Appl. No.: 10/884,219

(22) Filed: Jul. 2, 2004

(51) Int. Cl.
  *H04M 11/06* (2006.01)
(52) U.S. Cl. ............... 379/88.18; 379/88.13; 379/93.09; 455/566
(58) Field of Classification Search ............... 379/67.1, 379/88.17, 88.22, 93.09, 88.13, 88.18; 455/41.2, 455/466, 566; 705/14
See application file for complete search history.

(56) References Cited

U.S. PATENT DOCUMENTS

| 5,646,982 A * | 7/1997 | Hogan et al. ............ 379/88.22 |
| 6,088,429 A | 7/2000 | Garcia |
| 6,173,194 B1 * | 1/2001 | Vanttila ...................... 455/566 |
| 6,182,041 B1 | 1/2001 | Li et al. |
| 6,504,908 B1 | 1/2003 | Bellomo et al. |
| 6,680,999 B1 | 1/2004 | Garcia |
| 6,876,863 B1 * | 4/2005 | Schroeder et al. .......... 455/466 |
| 6,895,221 B2 * | 5/2005 | Gunnarsson ............... 455/41.2 |
| 6,912,274 B2 * | 6/2005 | Hitzeman et al. ........ 379/88.17 |
| 2002/0076015 A1 * | 6/2002 | Norwitz et al. .......... 379/93.09 |
| 2006/0074758 A1 * | 4/2006 | Yeh et al. ..................... 705/14 |

* cited by examiner

*Primary Examiner*—Gerald Gauthier
(74) *Attorney, Agent, or Firm*—Withrow & Terranova, PLLC

(57) ABSTRACT

A method and system are provided that communicate interactive event reminder messages across various communications platforms. According to one or more aspects of the present invention, an intended recipient for an event reminder message is defined by, for example, manual entry or interaction with a contacts list. The event reminder message content (e.g., text message, voice message, etc.) is defined. A date and time for transmitting the event reminder message is selected by, for example, manual entry or interaction with a calendar or scheduling application. A delivery method, e.g., telephony message, e-mail, SMS message, is selected for delivery of the event reminder message. The message is then transmitted to the intended recipient using the selected delivery method. Other aspects of the present invention provide for event reminder message receipt verification, and for the recipient to perform certain predefined actions in response to receipt of the event reminder message.

67 Claims, 7 Drawing Sheets

METHOD AND SYSTEM FOR PROVIDING INTERACTIVE EVENT REMINDERS

FIELD OF THE INVENTION

The present invention relates to the field of personal information management. Specifically, the present invention is directed to a method and system that provides interactive event reminders through use of various communications devices.

BACKGROUND OF THE INVENTION

For many people, keeping track of numerous daily events scheduled for work and personal time is a requirement of daily life. As life grows more complex, so has the need for more advanced methods of keeping track of these scheduled events. Therefore, many people have turned from simple calendars and "pencil and paper" organizers to computerized scheduling programs offering greater functionality and portability.

Scheduling software applications residing on personal computers, personal digital assistants ("PDA"), and even mobile telephone handsets can help track and remind users of the myriad of scheduled events with which they are often confronted. Such software applications include, for example, Microsoft Corporation's Microsoft® Office Outlook® and IBM's Lotus Notes®. Other, similar, applications provide scheduling functionality for PDAs and mobile telephone handsets, although such applications are typically far more compact and have restricted functionality due to the processing constraints of the devices on which they operate.

Some of these scheduling applications are capable of reminding users of upcoming scheduled events by displaying a "pop-up" window or playing an audible tone at the time an event is scheduled to occur to alert the user of the event. However, such event reminders are typically limited to display of visual or audible alerts on the device on which the scheduling application resides. Therefore, the user must be close to the device in order to perceive the reminder alert.

Furthermore, existing scheduling applications cannot interact with communications services such as telephone, e-mail, and short message service (SMS) messaging, to provide reminder messages, or event alerts, to users and other intended recipients of the reminder messages. Nor do these applications provide user-definable interactions with the communications services.

In light of the foregoing, there is a need for methods and systems that provide additional types of alerts for scheduled events. Furthermore, there is an identified need for devices that interact with communications services in order to provide user-defined alerts that may be carried on different communications services available to a user. In addition, there is an identified need for devices that allow a user to interact with different communications services after receipt of a message alerting the user of a scheduled event.

SUMMARY OF THE INVENTION

The present invention improves the event reminder capabilities of existing scheduling applications by communicating event reminder messages to intended recipients across multiple communications systems. Therefore, according to one aspect of the present invention, a method and system is provided for creating and transmitting an event reminder message using the Interactive Event Notification Application of the present invention. According to this aspect, the user can either manually input the name of an intended recipient, or select the intended recipient from a contact list. The user then selects the date and time for transmitting the event reminder message to the intended recipient.

Next, the user may select the event reminder message delivery method. Methods for delivery of the event reminder message include, for example, telephone calls, e-mails, and SMS messages. More than one delivery method may be chosen by the user for a given event reminder message.

The user may then create the content of the event reminder message. The types of event reminder message content that a user may create are limited by the selected message delivery method. For example, a user may create text content for e-mail and SMS event reminder messages, but will be limited to audio message content if a telephone call delivery method is selected.

After it is scheduled by the user, the event reminder message is transmitted on the scheduled time and day to the intended recipient using the selected event reminder delivery methods. Other aspects, described below provide additional functionality to various aspects of the invention.

According to another aspect of the present invention, event reminder message content may include audio messages. A user may select audio messages from a list of pre-recorded audio messages or the user may personally record an audio message. Audio event reminder message content may then be delivered to the intended recipient through a telephony network.

According to another aspect, the present invention provides methods of verifying receipt of the event reminder message. For example, receipt may be verified by requiring the intended recipient to press one or more keys on a telephony keypad, by speaking into a telephony device, or sending a reply e-mail or SMS message.

According to other aspects, the present invention allows the intended recipient to perform certain actions after receiving an event reminder message. For example, the intended recipient may initiate a telephone call to a predetermined telephone directory number or send a preconfigured e-mail or SMS message.

Other aspects of the present invention permit the user to create a recurrence pattern for the event reminder. This allows event reminder messages to be transmitted on a routine basis to provide ongoing notification for events that occur routinely.

According to another aspect, the Interactive Event Notification Application of the present invention interacts with other software applications that a user may already use. For example, the Interactive Event Notification Application of the present invention may enable a user to select intended recipients from a list of contacts maintained in a contact management application. Similarly, the present invention may interact with calendar/scheduling application and allow the user to create reminders as desired for events that are scheduled on the scheduling application.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

A preferred embodiment of the present invention is implemented in an Interactive Event Notification Application that may run on a general purpose computer. Those of ordinary skill in the art will recognize, however, that the present invention may be implemented in applications running on computer networks, or that the functionality may be implemented in data or telephony network devices. These implementations also fall within the scope of the disclosure and the accompanying claims.

Figure 1:
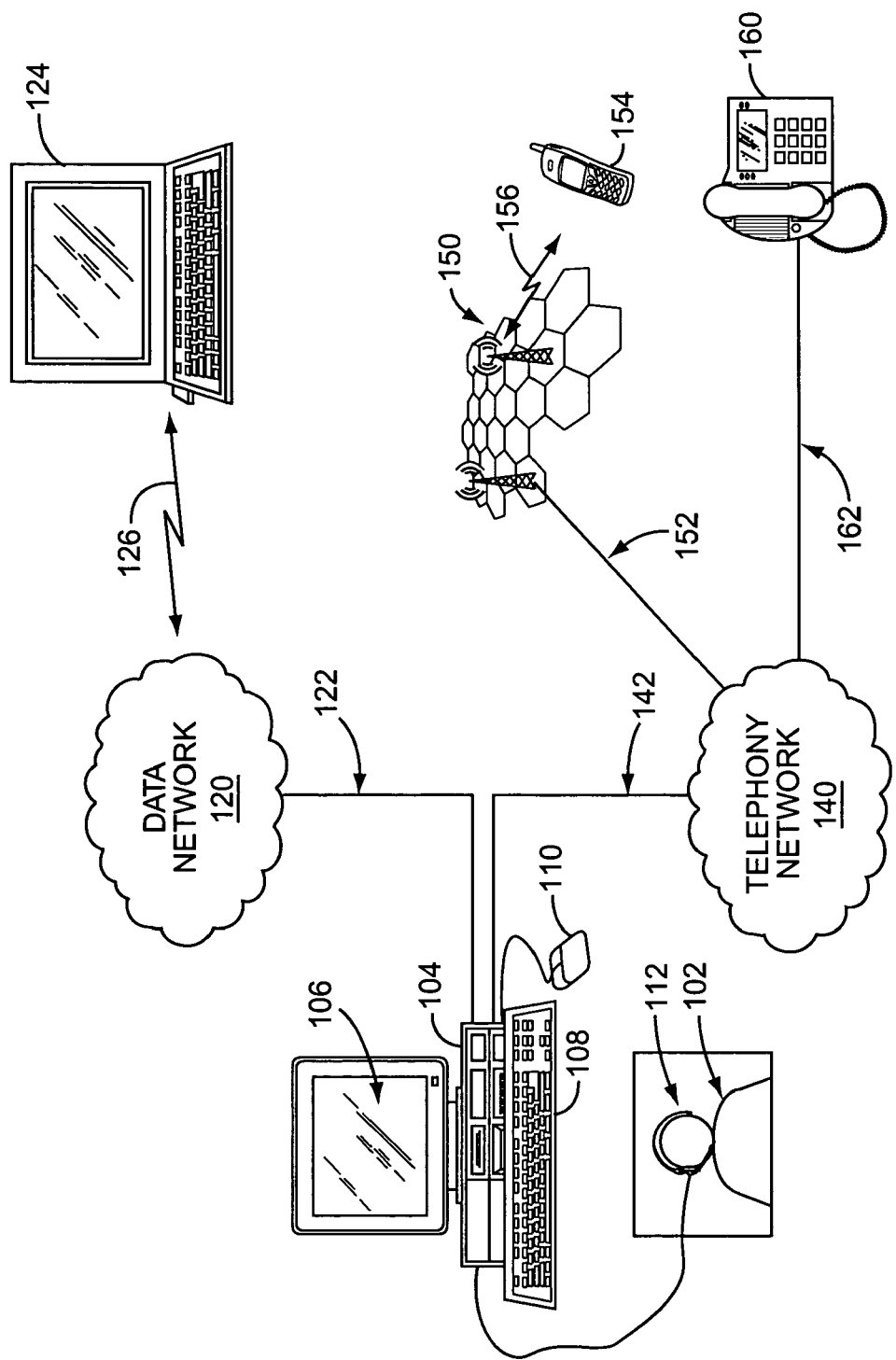
FIG. 1 illustrates a number of features of a communications environment in which embodiments of the present invention may operate.

FIG. 1 illustrates a typical communications environment in which a preferred embodiment of the present invention operates. As shown, FIG. 1 illustrates a person using the Interactive Event Notification Application implementing the present invention, i.e., a "user" 102. The user 102 is located in proximity to a general purpose computer 104 with a connected display device 106 used for interacting with the computer 104. A keyboard 108, mouse 110, and other devices may also be connected to the computer 104 to provide user input to the computer 104. Also connected to the computer 104 are audio speakers and a microphone represented by a headset 112. The headset 112 permits the user 102 to interact with various audio functions of the Interactive Event Notification Application.

The computer 104 may be connected to a data network 120 over data connection 122 using an available networking technology. One of ordinary skill in the art will understand that the data network 120 represents an array of potential networks. For example, data network 120 may represent local area networks, wide area networks, private networks, public networks (e.g., the Internet), or any combination of these, as necessary to complete the data communications described below. One of ordinary skill in the art will also recognize that technologies currently exist, and will be developed in the future, for communicating across these various networks. In a preferred embodiment of the present invention, the computer 104 is capable of interacting, directly or indirectly, with the data network 120 using various protocols such as Transmission Control Protocol/Internet Protocol ("TCP/IP"), Hypertext Transport Protocol ("HTTP"), and File Transfer Protocol ("FTP").

Other exemplary devices may be connected to the data network 120. For example, other computers configured with e-mail applications may reside on the network such that they are disposed to receive event reminder messages created by the user 102 on the Interactive Event Notification Application. For example, a laptop computer 124 may be connected to the data network 120 over wireless data connection 126. The laptop computer 124 is configured to include e-mail applications (not shown).

Also shown on FIG. 1 is a telephony network 140. Those of ordinary skill in the art will recognize that the telephony network 140 represents the array of telephony networks that are presently in existence and that may be developed in the future. For example, the telephony network 140 represents public switched telephone networks including circuit-switched telephony networks, mobile telephony networks, and packet-based telephony networks.

According to a preferred embodiment, the computer 104 is connected to the telephony network across telephony connection 142. Those of ordinary skill in the art will understand that telephony connection 142 represents the array of telephony services available for communications with the telephony network 140, including, for example, "plain old telephone" (POTS) service, mobile telephone service, ISDN service, or any other telephony service that enables a customer to place a call to a directory number associated with a public telephone network.

Also connected to the telephony network 140, though connection 152, is a representative mobile telephony network 150 which communicates with representative mobile handheld device 154 across air interface 156. Although mobile telephony networks are generally considered part of the overall telephony network 140, the representative mobile telephony network 150 is shown here to aid the illustration and description.

Also connected to the telephony network is a representative telephony device 160 that may be connected to the telephony network across telephony connection 162. Similar to telephony connection 142, telephony connection 162 also represents the array of telephony services available for communications with the telephony network 140, including, for example, "plain old telephone" (POTS) service, mobile telephone service, ISDN service, or any other telephony service that enables a customer to place a call to a directory number associated with a directory assistance service.

Figure 2:
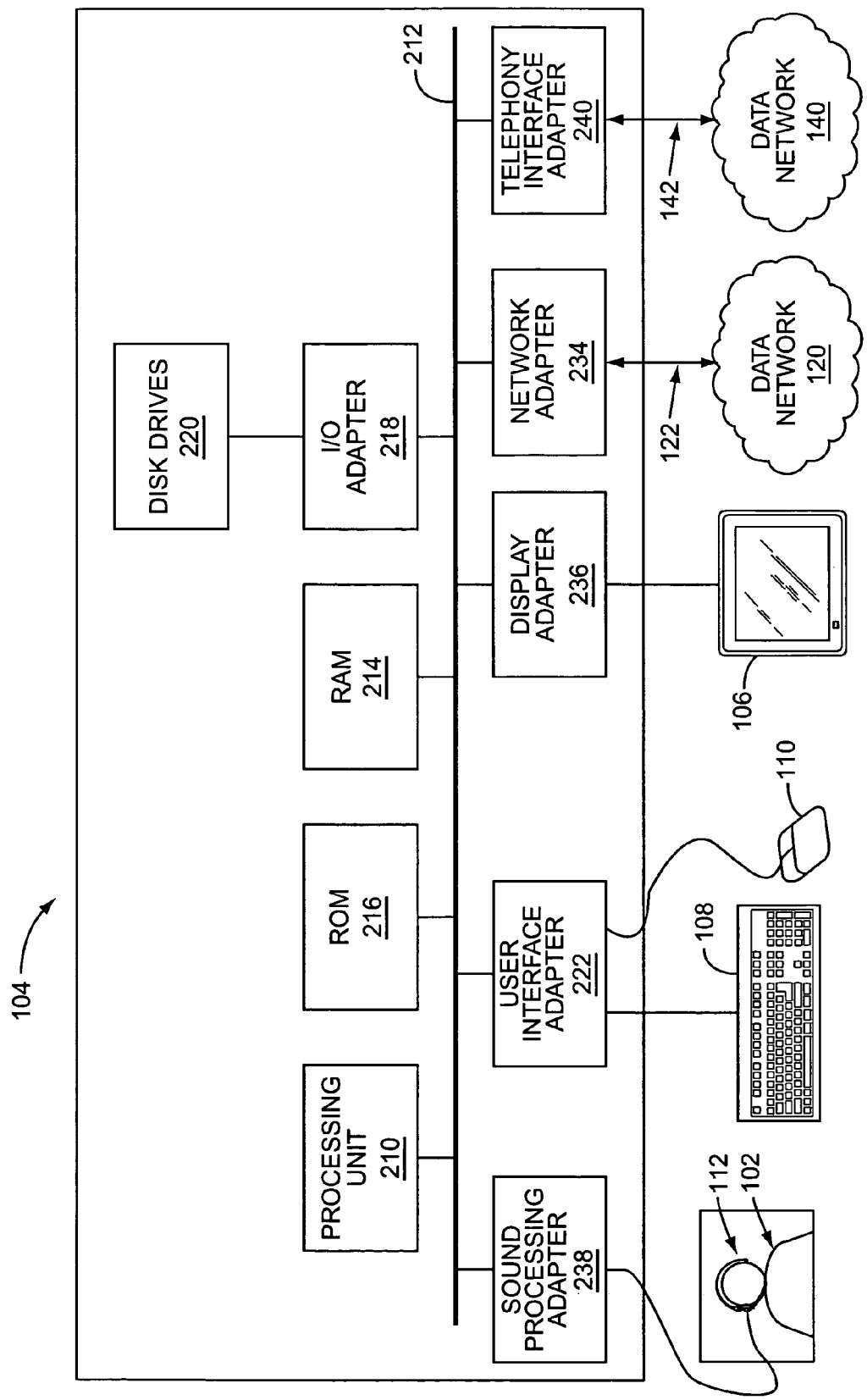
FIG. 2 is a block diagram illustrating aspects of a computer system on which the present invention may operate.

A representative hardware environment for practicing the Interactive Event Notification Application implementing the present invention is depicted in FIG. 2. FIG. 2 thus illustrates an exemplary hardware configuration for the computer 104 of FIG. 1. The computer processing system includes a processing unit 210, such as a conventional microprocessor, and a number of other units interconnected via system bus 212. The processing unit 210 may include other circuitry not shown herein, which will include circuitry commonly found within a microprocessor, e.g., execution unit, bus interface unit, arithmetic logic unit, etc.

The system may include different memory devices, including random access memory (RAM) 214 and read only memory (ROM) 216. Also shown is an input/output (I/O) adapter 218 for connecting peripheral devices such as disk drives 220 to the system bus 212. A display adapter 236 is also provided for connecting the system bus 212 to display device 106.

Also included is a user interface adapter 222 for connecting a keyboard 108, a mouse 110, and/or other user interface devices to the system bus 212. Furthermore, a sound processing adapter 238 is provided allowing the user 102 to create audio files by using the microphone of the attached headset 112.

A network adapter 234 is also provided for connecting the system to the data network 120. A telephony interface adapter 240 is also provided for connecting the system to the telephony network 140.

Figure 3:
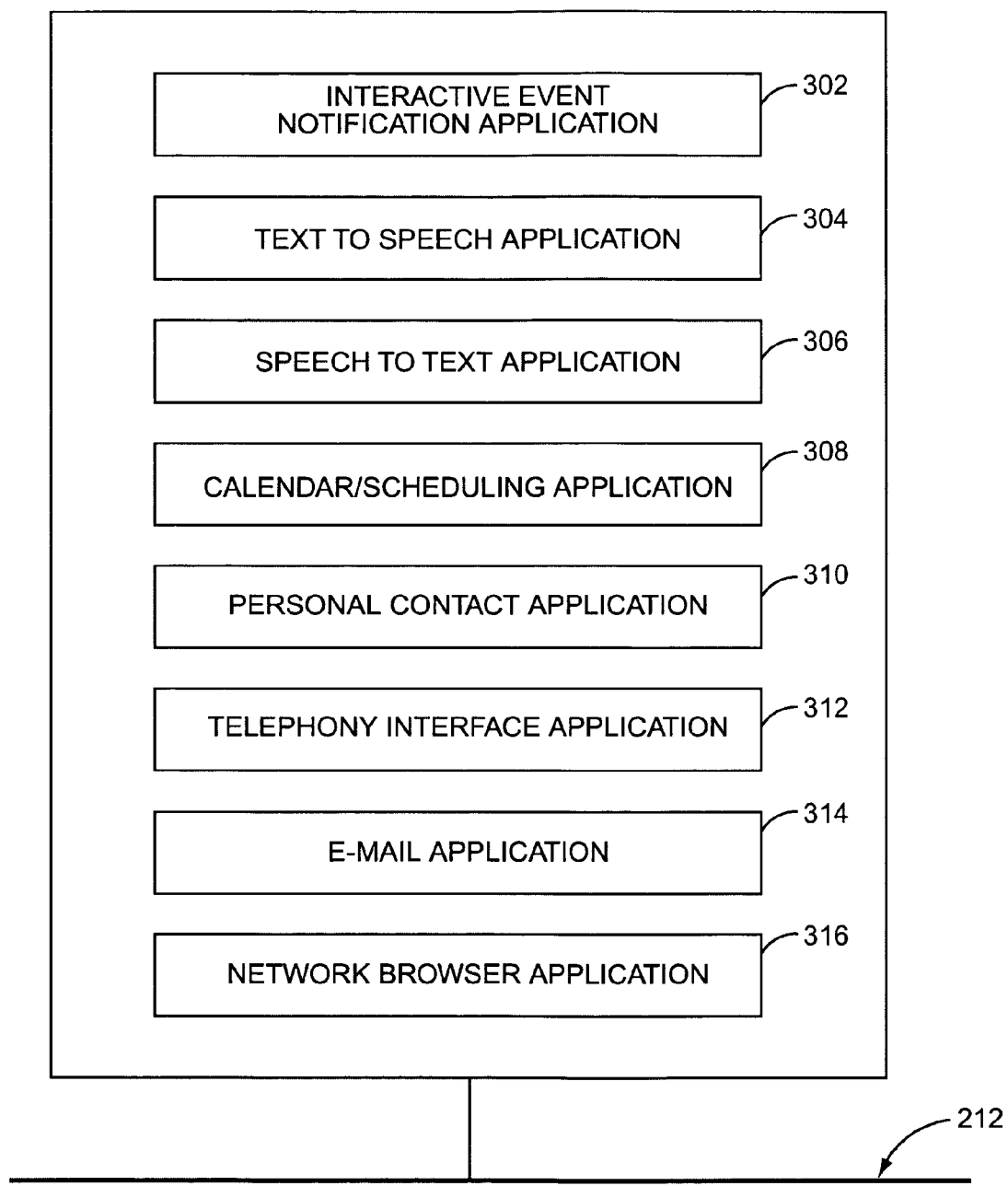
FIG. 3 is a block diagram illustrating software applications that may be associated with aspects of the present invention and which may be loaded onto the computer system illustrated in FIG. 2.

As show in FIG. 3, according to a preferred embodiment, the present invention is preferably embodied as a software application, such as the Interactive Event Notification Application 302, and loaded into the RAM 214 of the computer 102 hardware illustrated in FIG. 2. Also according to a preferred embodiment, the Interactive Event Notification Application 302 implementing the present invention interacts with other applications residing on computer 104. One of ordinary skill in the art will realize that the functionality of each of the applications illustrated in FIG. 3 could be included in the Interactive Event Notification Application 302 rather than requiring that the Interactive Event Notification Application 302 interact with other stand-alone programs.

As further illustrated in FIG. 3, a text-to-speech application 304 and a speech-to-text application 306 are provided to interact with the Interactive Event Notification Application 302. These applications allow a user 102 to record text event reminder messages by converting audio output of the headset 112 to text by means of the speech-to-text application 306. Furthermore, the text-to-speech application 304 allows the user 102 to listen to replies and verification messages received as text messages and to create audio messages from text entries. Other uses of text-to-speech applications in conjunction with reminder systems is generally described in U.S. Pat. No. 6,182,041, to Li et al., commonly assigned to Nortel Networks Limited, which is incorporated by reference.

Also loaded onto the computer 104, and capable of interacting with the Interactive Event Notification Application 302, is a calendar/scheduling application 308 and a personal contact application 310. The Interactive Event Notification Application 302 implementing the present invention may interact with existing applications such as calendar/scheduling application 308 and the personal contact application 310 to obtain information for creating and scheduling event reminder messages.

Also illustrated in FIG. 3 is a telephony interface application 312. The Interactive Event Notification Application 302 will interact with the telephony interface application in order to communicate with the telephony network 140 through the telephony interface adapter 240. These communications include the ability to initiate and receive telephone calls with audio messages that are processed according to the processes defined by the Interactive Event Notification Application 302.

In addition, in one embodiment, the Interactive Event Notification Application 302 interacts with an e-mail application 314 to send event reminder messages via e-mail. For example, the Interactive Event Notification Application 302 may send an event reminder messages via e-mail to laptop computer 124 across the data network 120 as illustrated in FIG. 1. Typically included in many e-mail programs is the ability to send and receive SMS messages that are compatible with mobile telephony networks such as the mobile telephony network 150 illustrated in FIG. 1. SMS messages permit, for example, a text message to be transmitted to the mobile handheld device 154. A person using the mobile handheld device 154 may also transmit reply text messages.

Figure 4A:
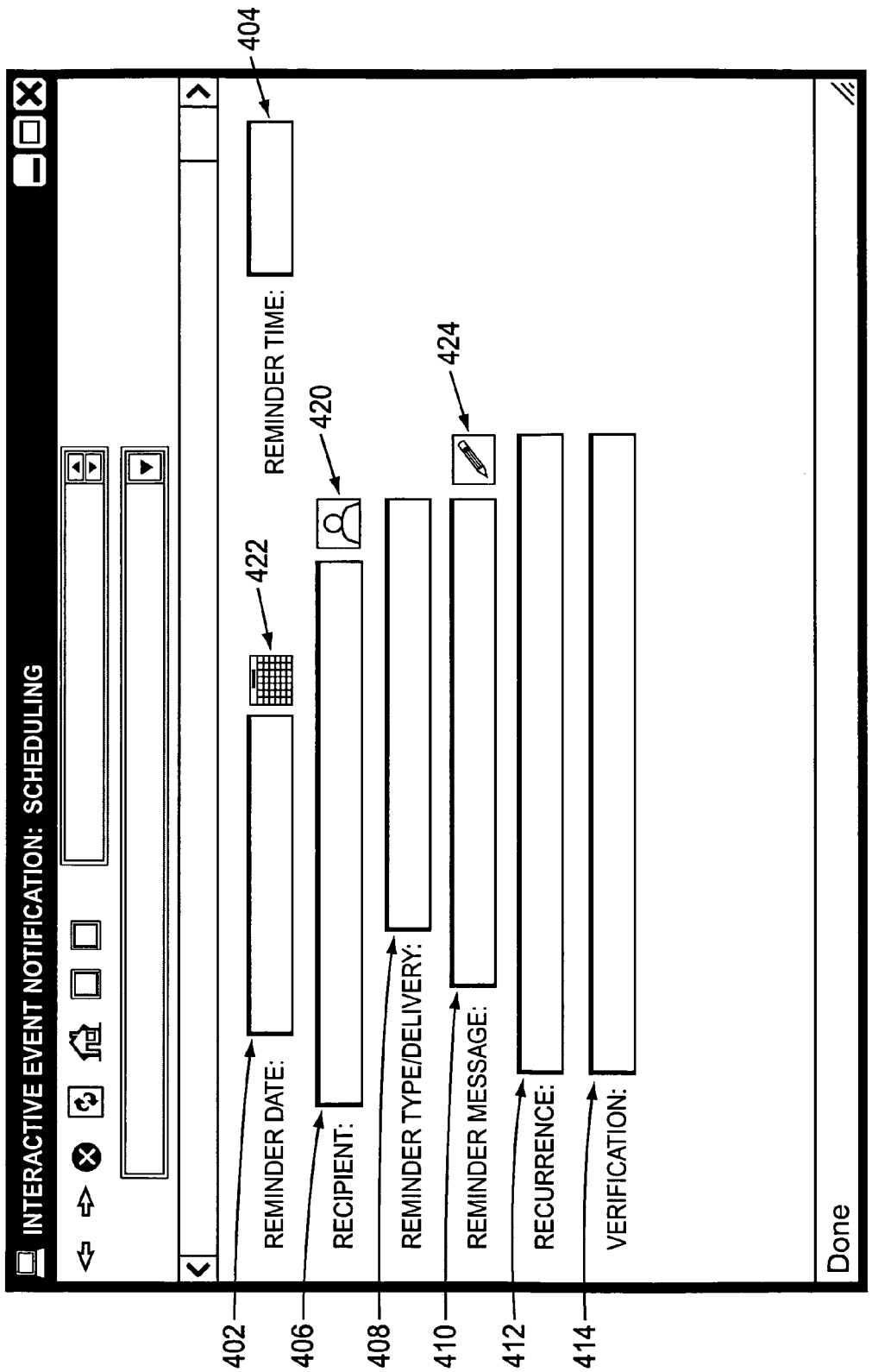
FIGS. 4A-4B are examples of a graphical user interface that may be associated with an embodiment of the present invention.

In one embodiment, the Interactive Event Notification Application 302 includes a graphical user interface ("GUI") for scheduling and determining the various characteristics of event reminder messages. The GUI, for example, may be shown on display device 106 through use of a network browser application 316, such as Microsoft® Internet Explorer®. FIG. 4A illustrates an example of a GUI displayed on the network browser application 316.

As shown in FIG. 4A, the GUI provides a reminder date field 402 and a reminder time field 404. The user 102 may simply enter the desired time and date into these fields, or, preferably, the user 102 may click on a scheduling icon 422 which will then cause the GUI to display any events scheduled on the calendar/scheduling application 308. The user 102 may then simply select a previously scheduled event and the Interactive Event Notification Application 302 will fill in the appropriate values in the reminder date field 402 and reminder time field 404.

Figure 4B:
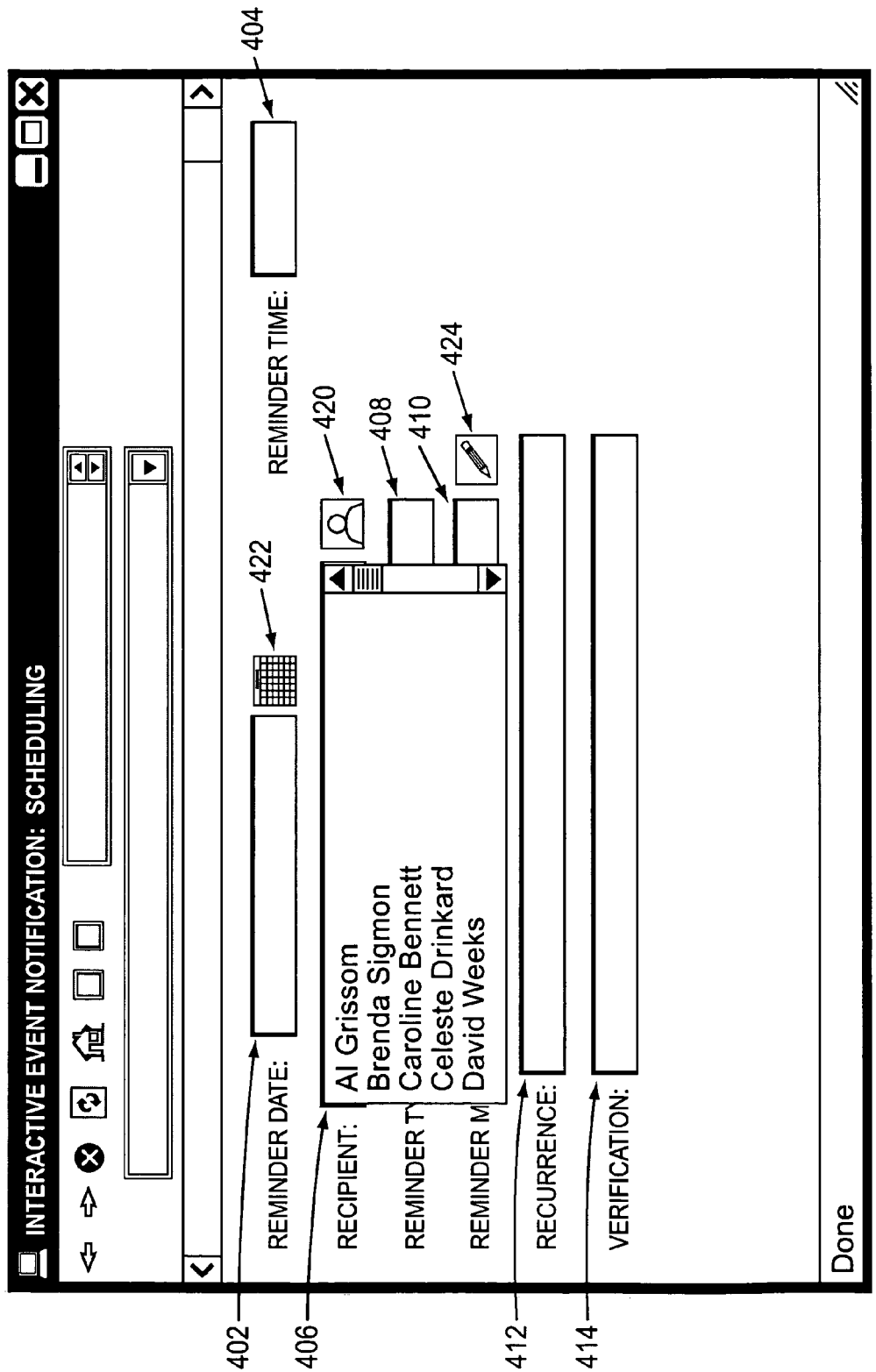

The GUI also provides a recipient field 406 where the user 102 may enter the name of the intended recipient and any associated contact information the Interactive Event Notification Application 302 will use to contact the intended recipient, e.g., a telephone number, an e-mail address, etc. As with the reminder date field 402 and reminder time field 404, the user 102 may simply enter the desired recipient information into the field, or, preferably, the user 102 may click on a contact icon 420 which will then cause the GUI to display contact listed in the personal contact application 308. An example of a drop list displaying available contact information is shown in FIG. 4B. The user 102 may then simply select a contact and the Interactive Event Notification Application 302 will fill in the appropriate values in the recipient field 406. Of course, the user 102 may herself be the intended recipient and be scheduling an event reminder message to be transmitted to the user at various locations, e.g., on mobile handheld device 154, on laptop 124, or on another telephone device 160 of FIG. 1.

Next, the user 102 may select the method for delivering the event notification message by choosing an available method from the reminder type/delivery field 408. It is anticipated that the Interactive Event Notification Application 302 will interact with many different communications systems and transmit event reminder messages using these systems. In one embodiment of the present invention, the user 102 may select to send event reminder messages by having the Interactive Event Notification Application 302 place a telephone call and play an audio reminder to the intended recipient. The user 102 may also select to transmit event reminder messages by e-mail to another computer, such as laptop computer 124 of FIG. 1. The user 102 may also select to send an SMS event reminder message to a mobile handheld device such as the mobile handheld device 154 of FIG. 1. In a preferred embodiment, the user 102 may select multiple delivery options for an event reminder message.

Once the event reminder message delivery option is chosen, the user 102 may input the content of the reminder message. If the content is a text message, the user 102 may enter the message by typing in the reminder message field 410. Alternatively, if the content is an audio message, the Interactive Event Notification Application 302 will prompt the user 102 to record a voice message.

According to another embodiment of the present invention, the Interactive Event Notification Application 302 will include a number of pre-recorded audio messages and a list of common text messages in a message library. The user 102 may access these saved messages by, for example, pressing a saved message icon 424 on the GUI and selecting a desired entry from the message library. The user 102 may also add newly created audio and text messages to the message library for later use.

The GUI of FIG. 4A also permits the user 102 to select a recurrence pattern for the event verification message by entering the pattern type in a recurrence field 412, or by selecting one of the available patterns from a drop-down menu. Typical recurrence patterns and methods for implementing them are known in the art.

The GUI of FIG. 4A also permits the user 102 to select an event reminder message receipt verification method for the event verification message by entering the verification method type in a verification field 414, or by selecting one of the available patterns from a drop-down menu. The Interactive Event Notification Application 302 provides a number of different verification methods. For example, the Interactive Event Notification Application 302 may require an intended recipient to press a certain key on a telephony device keypad or speak into the handset of a telephony device in order to verify receipt of the message. For e-mail and SMS messages, the Interactive Event Notification Application 302 may require an intended recipient to send a reply message in order to verify receipt of the message.

In another embodiment of the present invention, a reminder message may be configured such that the message content asks the intended recipient whether a task was completed. For such cases, the verification function could be used to verify that the task was completed as well as that the event reminder message was received. In this embodiment, the intended recipient might be required to make multiple entries on a keypad or send a reply e-mail or SMS message containing specific information.

According to another embodiment, the Interactive Event Notification Application 302 also permits an intended recipient to request that certain actions be taken. For example, upon receipt of the event reminder message, the intended recipient may request to be connected to a predetermined telephone number or to send a pre-configured e-mail or SMS message. The intended recipient would request such actions by interacting with the telephony keypad, a voice recognition application, or by including the required information in a reply e-mail or SMS message. The Interactive Event Notification Application 302 would then process the requested actions. For example, the Interactive Event Notification Application 302 may place a call for the intended recipient to a predetermined directory number.

Figure 5A:
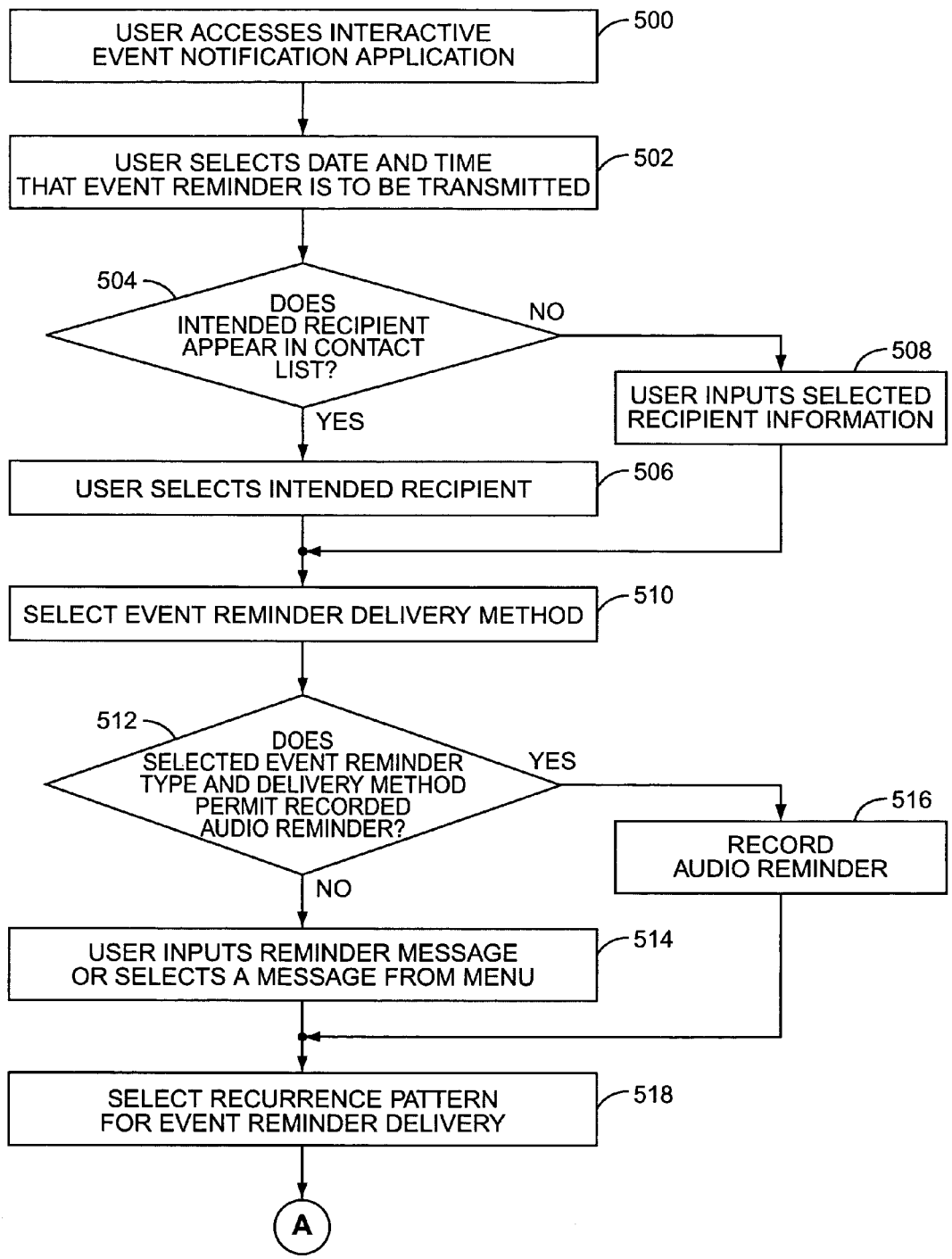
FIGS. 5A-5B are flow charts illustrating aspects of an embodiment of the present invention.

The operation of the Interactive Event Notification Application 302 implementing the present invention is further illustrated by reference to FIG. 5. As shown at step 500, the user 102 accesses the Interactive Event Notification Application 302 which is loaded into RAM 214 on computer 104.

Using the GUI presented in the network browser application 316, the user 102 selects a date and time that event reminder message is to be transmitted to an intended recipient (step 502).

The user 102 next defines the intended recipient for the event reminder message. The user 102 checks to determine if the intended recipient appears in the contact list (step 504). If so, the user 102 may select the intended recipient from the contact list (step 506). If the intended recipient does not appear in the list, the user 102 may input the intended recipient's name in the recipient field 406 (step 508).

The user 102 next selects a delivery method for the event reminder message (step 510). Each type of delivery method will permit the user 102 to enter certain types of message content. For example, delivery of an event reminder message through a telephony network will permit audio messages.

Thus, once the delivery method is selected, the Interactive Event Notification Application 302 determines if an audio file may be recorded (step 512). If not, the user 102 can input a text message or select a message from the message library (step 514). If the delivery method allows audio reminders, the user 102 will be prompted to record an audio message (step 516). Alternatively, the user 102 could select a pre-recorded audio message from the message library.

The user 102 also selects a recurrence pattern for the event reminder message delivery (step 518).

The Interactive Event Notification Application 302 next determines whether the selected delivery type permits message receipt verification (step 520). If not, the event reminder message is transmitted to the intended recipient using selected event reminder delivery method on the scheduled date and time (step 522).

If the delivery method permits message receipt verification, the Interactive Event Notification Application 302 allows the user 102 to select an event reminder verification method (step 524). The Interactive Event Notification Application 302 next checks to determine if verification has been received for a given message (step 526). If verification has been received, the Interactive Event Notification Application 302 will cease transmitting the message until the next designated recurrence (step 528). If verification has not been received, the Interactive Event Notification Application 302 determines whether a predetermined time period and/or a predetermined number of deliver attempts has been exceeded (step 532). If the predetermined time period or delivery attempts have not been exceeded, the event reminder message is transmitted to the intended recipient using selected event reminder delivery method on the scheduled date and time (step 522). A counter mechanism may be also be provided to record the number of delivery attempts that is referenced in determining if the number of delivery attempts has been exceeded (step 534).

According to another aspect of the present invention, the Interactive Event Notification Application 302 also provides the user 102 with notification that an event reminder message was or was not received by the intended recipient. According to this aspect, the Interactive Event Notification Application 302 can send a message to the user 102 using any of the delivery methods discussed above. A typical message may include a statement that delivery receipt was verified and the time and date that the delivery receipt was verified. The Interactive Event Notification Application 302 may also send a notification that delivery verification was not received after, for example, a certain number of delivery attempts or a predetermined period of time.

Figure 5B:
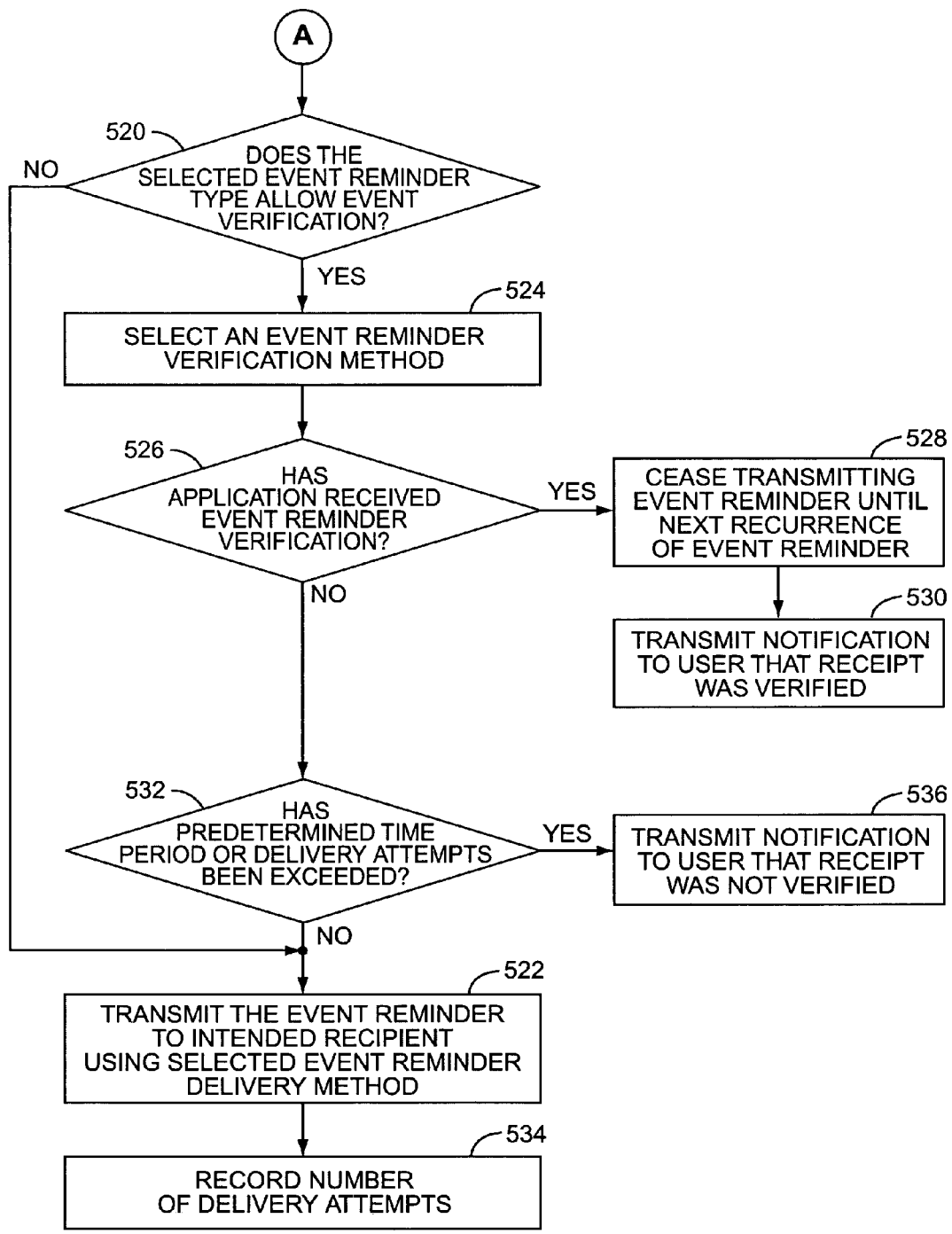

Continuing the example above illustrated in FIG. 5B, if the Interactive Event Notification Application 302 receives verification of receipt, notification may be transmitted to the user 102 that the receipt was verified using any of the delivery methods discussed above (step 530). Similarly, if receipt was not verified after the predetermined time period or delivery attempts are exceeded, notification may be transmitted to the user 102 that receipt was not verified (step 536).

It is to be understood that the present invention illustrated herein may be implemented by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, tape, or any similar media. The media can also be a memory storage device or collection of memory storage devices such as read-only memory (ROM) or random access memory (RAM). Additionally, the computer program code can be transferred to the appropriate hardware over a data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s).

These computer program instructions may also be stored in a computer-readable memory that can direct a computer or other programmable data processing apparatus to function in a particular manner such that the instructions stored in the computer-readable memory provide a service, product or article of manufacture, including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

Those skilled in the art will also recognize improvements and modifications to the preferred embodiments of the present invention. All such improvements and modifications are considered within the scope of the concepts disclosed herein and the claims that follow.

What is claimed is:

1. A method for sending an event reminder message, comprising:
   a) defining an intended recipient for the event reminder message;
   b) selecting a date and a time for transmitting the event reminder message to the intended recipient;
   c) selecting at least one event reminder message delivery method from a plurality of delivery methods;
   d) defining event reminder message content, wherein the event reminder message content is a message content type that may be delivered using the selected event reminder message delivery method; and
   e) transmitting the event reminder message to the intended recipient using the selected event reminder message delivery method.

2. The method of claim 1, wherein the event reminder message content comprises recorded voice messages that may be selected from a list of pre-recorded voice messages or voice messages recorded by a system user.

3. The method of claim 2, wherein voice messages recorded by the system user may be stored for subsequent use in the list of pre-recorded voice messages.

4. The method of claim 3, wherein the event reminder message delivery method comprises delivery of the voice message to the intended recipient through a telephony network.

5. The method of claim 4, further comprising receiving verification that the event reminder message has been received by the intended recipient.

6. The method of claim 5, further comprising selecting an event reminder message receipt verification method for the event reminder message.

7. The method of claim 6, wherein the selected event reminder message receipt verification method requires the intended recipient to press one or more keys on a telephony keypad or to speak into a telephony device.

8. The method of claim 7, further comprising defining at least one action that may be initiated by the intended recipient upon receipt of the event reminder message.

9. The method of claim 8, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

10. The method of claim 9, further comprising selecting a recurrence pattern for the event reminder.

11. The method of claim 10, wherein defining the intended recipient comprises selecting the intended recipient from a list of contacts maintained in at least one contact management program.

12. The method of claim 11, wherein scheduling the date and the time for transmitting the event reminder message comprises scheduling an event on a personal scheduling program.

13. The method of claim 1, wherein the event reminder message content comprises a text message.

14. The method of claim 13, wherein the event reminder message delivery method comprises delivery of the text message in an e-mail message delivered to the intended recipient through a data network, and wherein the e-mail message may be selected from a list of pre-configured e-mails or entered by a system user.

15. The method of claim 14, further comprising receiving verification that the event reminder has been received by the intended recipient.

16. The method of claim 15, further comprising selecting an event reminder message receipt verification method for the event reminder.

17. The method of claim 16, wherein the event reminder message receipt verification method requires the intended recipient to transmit a reply e-mail.

18. The method of claim 17, further comprising defining at least one action that may be initiated by the intended recipient upon receipt of the event reminder message.

19. The method of claim 18, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

20. The method of claim 19, further comprising selecting a recurrence pattern for the event reminder.

21. The method of claim 20, wherein defining the intended recipient comprises selecting the intended recipient from a list of contacts maintained in at least one contact management program.

22. The method of claim 21, wherein scheduling the date and the time for transmitting the event reminder message comprises scheduling an event on a personal scheduling program.

23. The method of claim 22, wherein scheduling the date and the time for transmitting the event reminder message further comprises defining a period of time for transmitting the event reminder message prior to the actual time of an event scheduled on a personal scheduling program.

24. The method of claim 13, wherein the event reminder message delivery method comprises delivery of the text message in a short message service (SMS) compatible message delivered to the intended recipient through a telephony network.

25. The method of claim 24, further comprising receiving verification that the event reminder has been received by the intended recipient.

26. The method of claim 25, further comprising selecting an event reminder message receipt verification method for the event reminder.

27. The method of claim 26, wherein the event reminder message receipt verification method requires the intended recipient to transmit a reply SMS-compatible message.

28. The method of claim 27, further comprising defining at least one action that may be initiated by the intended recipient upon receipt of the event reminder message.

29. The method of claim 28, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

30. The method of claim 29, further comprising selecting a recurrence pattern for the event reminder.

31. The method of claim 30, wherein defining the intended recipient comprises selecting the intended recipient from a list of contacts maintained in at least one contact management program.

32. The method of claim 31, wherein scheduling the date and the time for transmitting the event reminder message comprises scheduling an event on a personal scheduling program.

33. The method of claim 32, wherein scheduling the date and the time for transmitting the event reminder message further comprises defining a period of time for transmitting the event reminder message prior to the actual time of an event scheduled on a personal scheduling program.

34. An interactive event reminder message communication system, comprising:
  a) a user interface;
  b) a memory storage unit;
  c) an interface operably connected to a communications network; and
  d) a processor, associated with the user interface, the memory storage unit and the communications interface, adapted to:
    i) receive, from the user interface, a designation of an intended recipient for an event reminder message;
    ii) receive, from the user interface, event reminder message content for an event reminder message;
    iii) receive, from the user interface, a designation of a date and a time for transmitting the event reminder message to the intended recipient;
    iv) receive, from the user interface, designation of at least one event reminder message delivery method from a plurality of delivery methods; and
    v) transmit the event reminder message to the intended recipient using the designated event reminder message delivery method.

35. The interactive event reminder message communication system of claim 34, wherein the event reminder message content comprises recorded voice messages that may be selected from a list of pre-recorded voice messages or voice messages recorded by a system user.

36. The interactive event reminder message communication system of claim 35, wherein voice messages recorded by the system user may be stored for subsequent use in the list of pre-recorded voice messages.

37. The interactive event reminder message communication system of claim 36, wherein the event reminder message delivery method comprises delivery of the voice message to the intended recipient through a telephony network.

38. The interactive event reminder message communication system of claim 37, wherein the processor is further adapted to receive verification that the event reminder message has been received by the intended recipient.

39. The interactive event reminder message communication system of claim 38, wherein the processor is further adapted to receive, from the user interface, designation of an event reminder message receipt verification method.

40. The interactive event reminder message communication system of claim 39, wherein the selected event reminder message receipt verification method requires the intended recipient to press one or more keys on a telephony keypad or speak into a telephony device.

41. The interactive event reminder message communication system of claim 40, wherein the processor is further adapted to define at least one action that may be initiated by the intended recipient upon receipt of the event reminder message.

42. The interactive event reminder message communication system of claim 40, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

43. The interactive event reminder message communication system of claim 42, wherein the processor is further adapted to receive, from the user interface, designation of a recurrence pattern for the event reminder.

44. The interactive event reminder message communication system of claim 43, wherein intended recipient is selected from a list of contacts maintained in at least one contact management program.

45. The interactive event reminder message communication system of claim 44, wherein designation of the date and the time for transmitting the event reminder message comprises scheduling an event on a personal scheduling program.

46. The interactive event reminder message communication system of claim 45, wherein designation of the date and the time for transmitting the event reminder message further comprises designating a period of time for transmitting the event reminder message prior to the actual time of an event scheduled on a personal scheduling program.

47. The interactive event reminder message communication system of claim 34, wherein the event reminder message content comprises a text message.

48. The method of claim 47, wherein the event reminder message delivery method comprises delivery of the text message in an e-mail message delivered to the intended recipient through a data network and wherein the e-mail message may be selected from a list of pre-configured e-mails or entered by a system user.

49. The interactive event reminder message communication system of claim 48, wherein the processor is further adapted to receive verification that the event reminder message has been received by the intended recipient.

50. The interactive event reminder message communication system of claim 49, wherein the processor is further adapted to receive, from the user interface, designation of an event reminder message receipt verification method.

51. The interactive event reminder message communication system of claim 50, wherein the selected event reminder message receipt verification method requires the intended recipient to transmit a reply e-mail.

52. The interactive event reminder message communication system of claim 51, wherein the processor is further adapted to define at least one action that may be initiated by the intended recipient upon receipt of the event reminder message.

53. The interactive event reminder message communication system of claim 52, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

54. The interactive event reminder message communication system of claim 53, wherein the processor is further adapted to receive, from the user interface, designation of a recurrence pattern for the event reminder.

55. The interactive event reminder message communication system of claim 54, wherein intended recipient is selected from a list of contacts maintained in at least one contact management program.

56. The interactive event reminder message communication system of claim 55, wherein designation of the date and the time for transmitting the event reminder message comprises scheduling an event on a personal scheduling program.

57. The interactive event reminder message communication system of claim 56, wherein designation of the date and the time for transmitting the event reminder message further comprises designating a period of time for transmitting the event reminder message prior to the actual time of an event scheduled on a personal scheduling program.

58. The interactive event reminder message communication system of claim 57, wherein the event reminder message delivery method comprises delivery of the text message in a short message service (SMS) compatible message delivered to the intended recipient through a telephony network.

59. The interactive event reminder message communication system of claim 58, wherein the processor is further adapted to receive verification that the event reminder message has been received by the intended recipient.

60. The interactive event reminder message communication system of claim 59, wherein the processor is further adapted to receive, from the user interface, designation of an event reminder message receipt verification method.

61. The interactive event reminder message communication system of claim 60, wherein the selected event reminder message receipt verification method requires the intended recipient to transmit a reply SMS message.

62. The interactive event reminder message communication system of claim 61, wherein the processor is further adapted to define at least one action that may be initiated by the intended recipient upon receipt of the event reminder message.

63. The interactive event reminder message communication system of claim 62, wherein the intended recipient may initiate a telephone call to a predetermined telephone directory number, initiate sending a preconfigured short message service (SMS) compatible message to a predetermined SMS recipient, or initiate sending a preconfigured e-mail message to a predetermined e-mail recipient.

64. The interactive event reminder message communication system of claim 63, wherein the processor is further adapted to receive, from the user interface, designation of a recurrence pattern for the event reminder.

65. The interactive event reminder message communication system of claim 64, wherein intended recipient is selected from a list of contacts maintained in at least one contact management program.

66. The interactive event reminder message communication system of claim 65, wherein designation of the date and the time for transmitting the event reminder message comprises scheduling an event on a personal scheduling program.

67. The interactive event reminder message communication system of claim 66, wherein designation of the date and the time for transmitting the event reminder message further comprises designating a period of time for transmitting the event reminder message prior to the actual time of an event scheduled on a personal scheduling program.

* * * * *